United States Patent [19]

Di Gaetano

[11] Patent Number: 5,040,100

[45] Date of Patent: Aug. 13, 1991

[54] VEHICLE WHEEL WELL ILLUMINATION DEVICE

[76] Inventor: Ronald Di Gaetano, 4986 Periard, Pierrefonds, Quebec, Canada, H9J 3T4

[21] Appl. No.: 607,273

[22] Filed: Oct. 31, 1990

[51] Int. Cl.⁵ .............................................. B60Q 1/00
[52] U.S. Cl. ...................................... 362/80; 362/430
[58] Field of Search ................. 362/80, 216, 368, 370, 362/430, 83.3

[56] References Cited

U.S. PATENT DOCUMENTS 3,582,639  6/1971  Chamberlain ........................ 362/80
4,232,357 11/1980  Dietz ............................ 362/430 X Primary Examiner—Allen M. Ostrager
Attorney, Agent, or Firm—Shlesinger, Arkwright & Garvey

[57] ABSTRACT

A vehicle wheel well illumination device, comprising a pair of light sources and a resilient rod interconnecting the light sources in a spaced apart configuration. The resilient rod is capable of elastic deformation under a manual bending effort to bring the rod in a condition suitable to enter a wheel well of a vehicle. Discontinuance of the bending effort causes the rod to partially recover its original form, frictionally engaging the wheel well and retaining in place the light sources providing adequate lighting conditions.

7 Claims, 2 Drawing Sheets

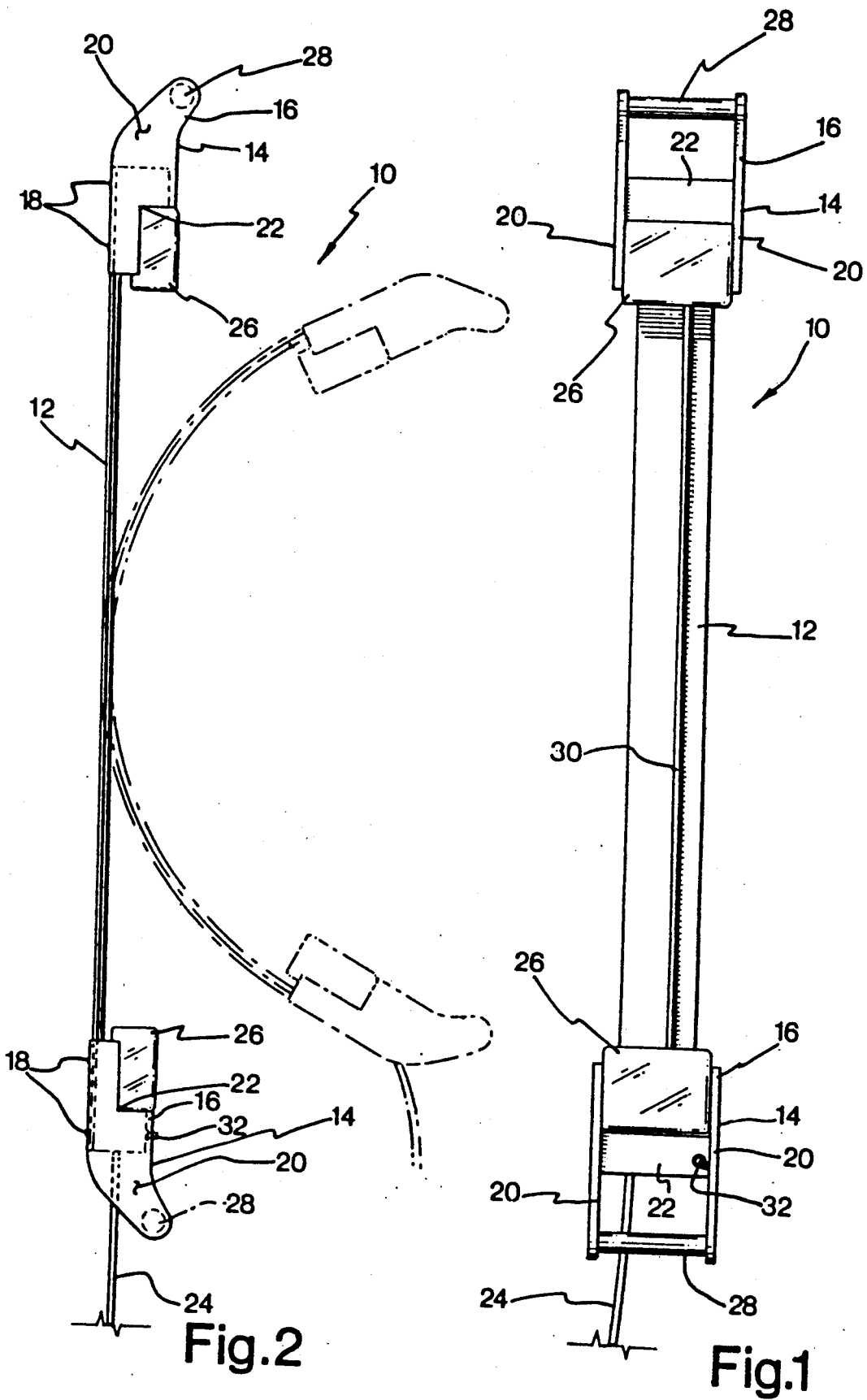

VEHICLE WHEEL WELL ILLUMINATION DEVICE

FIELD OF THE INVENTION

The invention relates to a device for illuminating a wheel well of a vehicle, particularly useful when performing repairs or inspections on components accessible in the wheel well area.

BACKGROUND OF THE INVENTION

Repair work performed on the braking or the suspension system on a vehicle requires the removal of one or more wheels to expose the wheel well area where the brake or suspension components can be accessed. When the work is carried out indoors, the ambient light is often inadequate to illuminate the wheel well due to its recessed configuration. Accordingly, additional lighting systems are required to enhance the visual acuity of the mechanic in the wheel well area.

It is common to use a simple light fixture comprised of a socket receiving a light bulb and provided with a hook for hanging the light fixture at the desired location. However, a vehicle wheel well has smooth surfaced walls unable to receive a hook and the light fixture can only be hung on a brake or a suspension component at the expense of reduced accessibility of the wheel well area because the light fixture interferes with the mechanic's hands and tools. In a different arrangement, a light fixture is positioned outside the vehicle to be serviced, oriented toward the wheel well. Although in such an arrangement the light fixture cannot interfere with the work to be performed in the wheel well, the body of the mechanic standing in front of the wheel well blocks at least partially the light produced from the light source, still resulting into an insufficient illumination.

OBJECTS AND STATEMENT OF THE INVENTION

An object of this invention is an illumination device for mounting within a wheel well, capable to adapt itself to various wheel well shapes and sizes to produce adequate lighting conditions in the wheel well.

Another object of the invention is an illumination device as defined above which is relatively simple and inexpensive to manufacture.

The present invention provides a vehicle wheel well illumination device comprising light source means and an elongated resilient rod supporting the light source means, the resilient rod being capable of elastic deformation under a manual bending effort to bring the rod in a condition suitable to enter a wheel well, discontinuance of the bending effort causing the rod to partially recover its original form, frictionally engaging the wheel well and retaining in place the light source means.

In a preferred embodiment, a pair of light sources are mounted in a spaced apart configuration on the resilient rod.

Due to the resiliency of the rod interconnecting the light sources, the illumination device according to the invention can be installed in various kinds of vehicles which have different wheel well sizes and shapes. In addition, the illumination device, when installed, extends along the periphery of the wheel well, whereby the possibility of interfering with the work to be performed is reduced.

BRIEF DESCRIPTION OF THE DRAWINGS

FIG. 1 is a front elevational view of a wheel well illumination device according to the invention, the resilient rod interconnecting the two light sources being shown in an unstressed condition;

FIG. 2 is a side elevational view of the illumination device shown in FIG. 1, depicting in dashed line the resilient rod in a stressed condition suitable to fit a wheel well.

DESCRIPTION OF A PREFERRED EMBODIMENT

Figure 3:
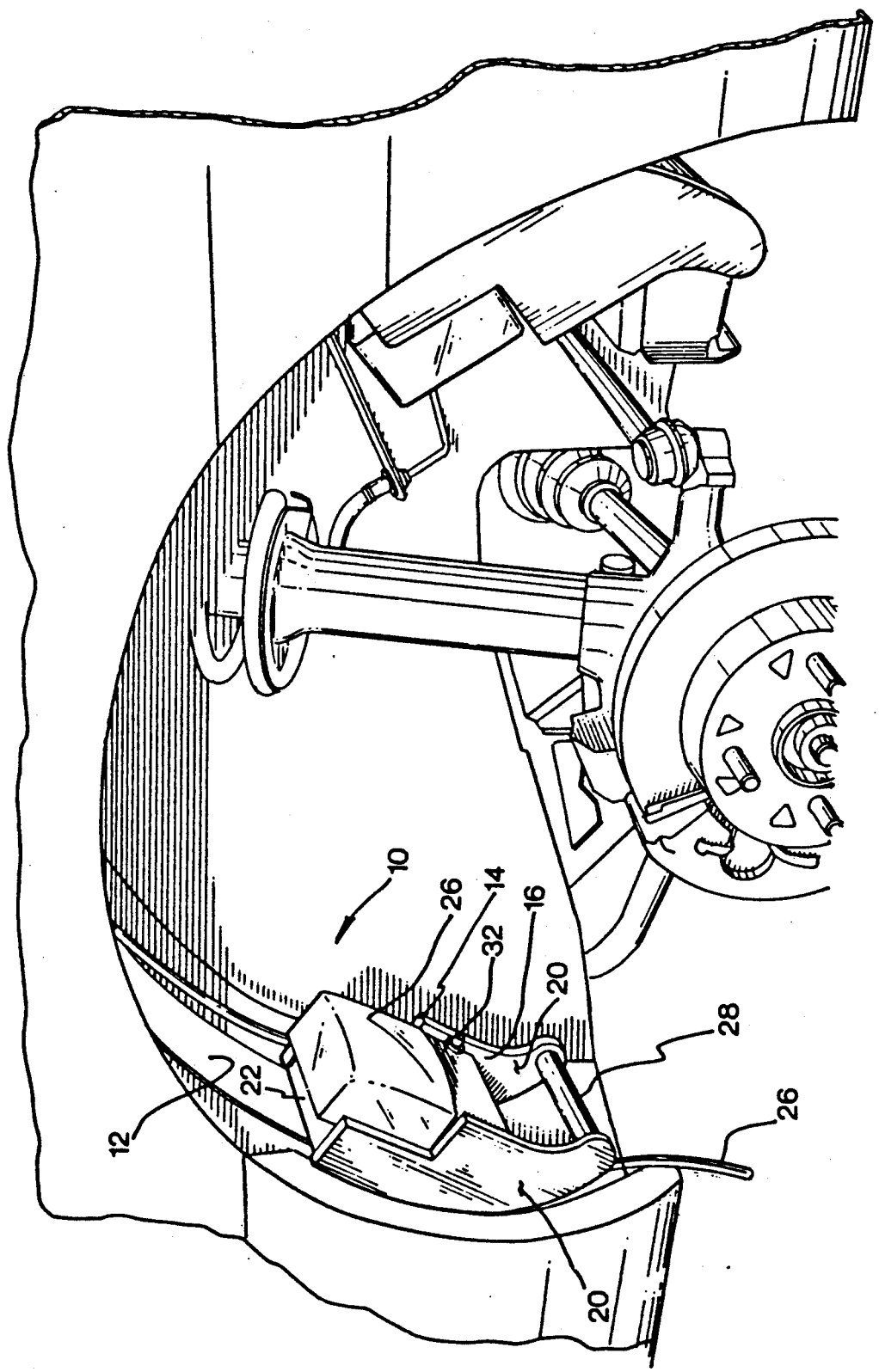
FIG. 3 is a perspective view of a vehicle wheel well showing the illumination device installed therein.

Referring now to the annexed drawings, the wheel well illumination device according to the invention is designated comprehensively by the reference numeral 10 and it comprises an elongated resilient rod 12 carrying at each end a light source 14. The rod 12 has a blade-like configuration. The resilience of the rod 12 is selected such that it can be bent to the shape shown in dashed lines in FIG. 2 by applying a manual effort. It will be evident to those skilled in the art that various materials may be employed for the construction of the rod 12 at the condition that they have the required resilience characteristics. Metals such as spring steel having high yield strength and low elastic modulus are prime candidates because they are extremely resistant, durable and inexpensive. However, certain plastics or composite material can also be used.

Each light source 14 comprises a housing 16 made of plastic material attached to the rod 12 by means of screws 18. The housing 16 comprises two side plates 20 disposed in a spaced apart configuration retaining therebetween a light bulb cage 22 which holds a conventional socket and light bulb assembly (not shown in the drawings) electrically connected to a power cord 24. The cage 22 is provided with a removable light transmissive screen 26 which permits the cage 22 to be opened for light bulb replacement purposes.

A cylindrical handle 28 extends between the side plates 20 to permit convenient grasping of the illumination device in order to bend it in the shape as shown in FIG. 2.

A power cord 30 extends between the socket light bulb assemblies of the light sources 16 in order to provide an electrical path from the power cord 24 to the light source 16 which is not directly connected thereto (the light source at the top of the rod 12 in FIGS. 1 and 2). The power cord 30 runs along the rod 12 and it may be envisaged to provide attachment clips in order to retain it in place and to prevent it from hanging loose when the rod is being bent.

If desired, an on/off switch 32 may also be provided on one of the light sources 16 to control the state of the electrical circuit of the illumination device 10, in order to turn on or off both light sources simultaneously.

The operation of the illumination device 10 is as follows. Assuming that the wheel well area of the vehicle has been made accessible by removing the wheel, as shown in FIG. 3, the illumination device 10 is manually grasped by holding in each hand a handle 28 and a bending effort is applied, whereby the rod 12 will assume a curved shape as shown in dashed lines in FIG. 2. In this condition, the illumination device is entered in the wheel well area and when the desired position is reached, the handles 28 are released. Due to its ability to recover its original shape, the resilient rod 12 will snap against the wall of the wheel well, creating a frictional engagement therewith and retaining in place the light sources 16. It will be appreciated that the light sources 16 extend against the periphery of the wheel well and therefore they do not significantly reduce the accessibility of the wheel well area while being capable to provide good lighting conditions.

Variants are possible. Instead of using a pair of light sources mounted at the ends on the resilient rod, it may be envisaged to employ a single light source mounted centrally on the resilient rod, or at any other desired location.

The above description of a preferred embodiment of this invention should not be interpreted in any limiting manner because the embodiment may be refined in various ways without departing from the spirit of the invention. The scope of the invention is defined in the annexed claims.

I claim:

1. A vehicle wheel well illuminating device, comprising:
   a light source means; and
   an elongated resilient rod, said light source means being mounted to said resilient rod, said rod being capable of elastic deformation under a manual bending effort to bring the rod in a condition suitable to enter a wheel well, discontinuance of the bending effort causing the rod to partially recover its form, frictionally engaging the wheel well and retaining in place said light source means to illuminate the wheel well.

2. A wheel well illumination device as defined in claim 1, comprising a pair of light sources mounted to said resilient rod in a spaced apart configuration.

3. A wheel well illumination device as defined in claim 1, wherein said resilient rod has a blade-like configuration and is made of metallic material.

4. A wheel well illumination device as defined in claim 2, wherein said light sources are mounted at the extremities of said resilient rod.

5. A wheel well illumination device as defined in claim 2, comprising:
   a light source housing at each end of said resilient rod;
   a light bulb socket electrically connected to a power cord leading outside said housing; and
   a light transmissive screen mounted to said housing to protect a light bulb in said socket.

6. A wheel well illumination device as defined in claim 5, comprising a power cord extending between the light source housings and running along said resilient rod.

7. A wheel well illumination device as defined in claim 5, comprising an on/off switch mounted to a light source housing to control the operation of said light sources.

* * * * *